UNITED STATES PATENT OFFICE.

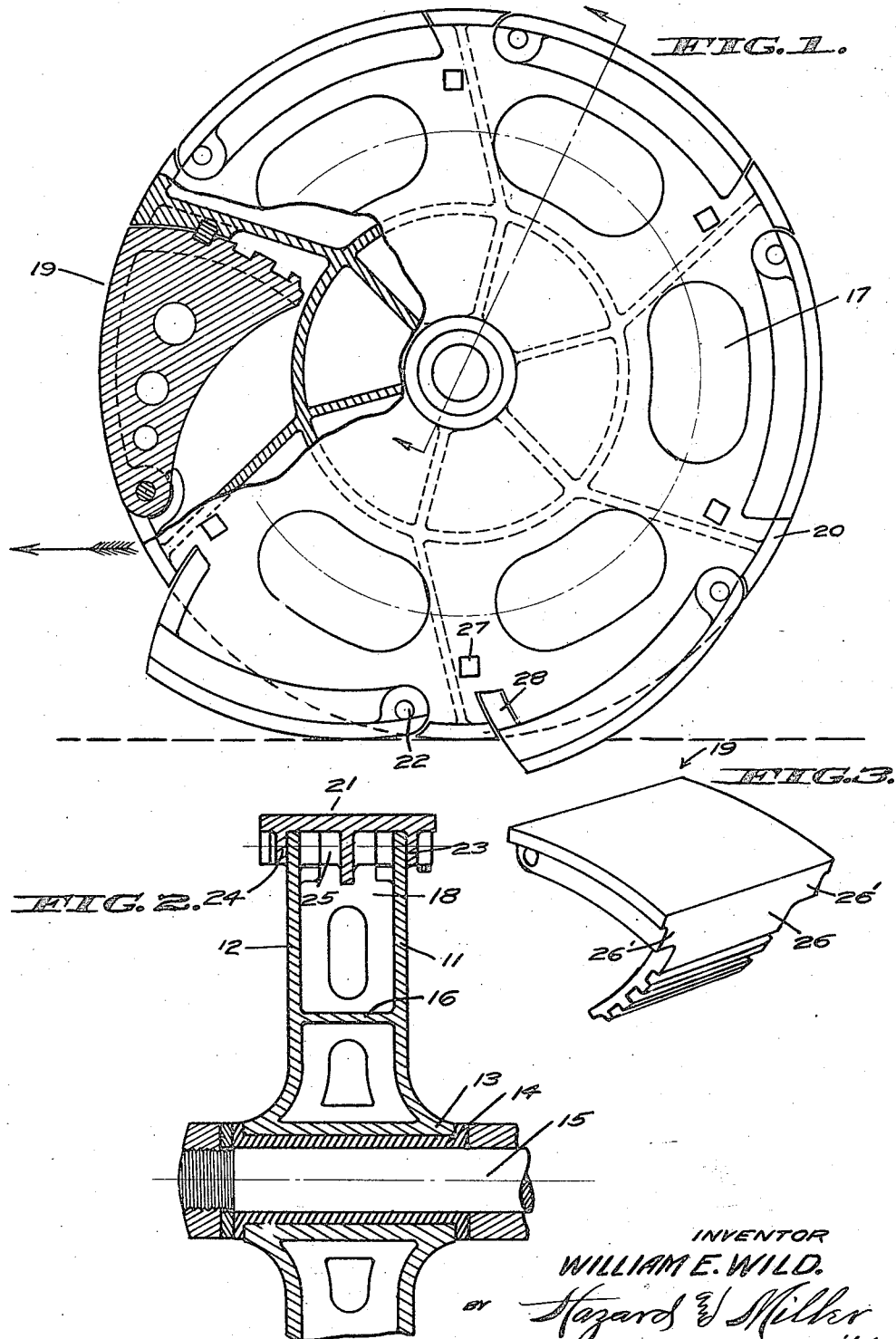

WILLIAM E. WILD, OF GARDENA, CALIFORNIA.

TRACTOR-WHEEL.

1,242,096.     Specification of Letters Patent.     Patented Oct. 2, 1917.

Application filed February 2, 1917. Serial No. 146.276.

*To all whom it may concern:*

Be it known that I, WILLIAM E. WILD, a citizen of the United States, residing at Gardena, in the county of Los Angeles and State of California, have invented new and useful Improvements in Tractor-Wheels, of which the following is a specification.

This invention relates to a wheel and particularly pertains to a wheel adapted for use upon tractors and other heavy duty vehicles.

It is the principal object of this invention to provide a tractor wheel which possesses means for adjustably determining the gripping action of the wheel periphery upon the ground.

Another object of this invention is to provide a tractor wheel which is decidedly strong in its construction and which may be adjusted to permit it to grip the ground with great force, or to pass over the ground without positively gripping it and thereby making it possible to use the wheels when traveling upon paved highways or over unprepared soil.

It is a further object of this invention to provide a tractor wheel which possesses few parts which are simple in their construction and adapted to be readily replaced.

Other objects will appear hereinafter.

The invention is illustrated, by way of example, in the accompanying drawings in which:

Figure 1 is a view in side elevation with parts broken away illustrating the tractor wheel with its adjustable tread members disposed in various positions of adjustment.

Fig. 2 is a partial view in vertical section as seen on the line 2—2 of Fig. 1 and illustrates the detail formation of the entire wheel.

Fig. 3 is a view in perspective illustrating one of the adjustable tread members as disassociated from the wheel.

Referring more particularly to the drawings, 10 indicates the body of a vehicle wheel which is here shown as formed of cast metal. This body is designed with oppositely disposed circular face plates 11 and 12 which lie parallel to each other and are formed integral with a hub 13. This hub may be of any design for the reception of particular makes of anti-friction bearings but, as here shown, the hub is provided to accommodate an anti-friction bushing 14 by which the wheel is rotatably supported upon an axle 15. A cross web 16 is formed between the side plates 11 and 12 to more thoroughly reinforce the structure. In order to lighten the weight of the wheel a series of openings 17 are formed throughout the circumference of each of the plates 11 and 12. These openings occur between radial webs 18 which are here shown as six in number and which form compartments within which the flanges of adjustable tread members or flights 19 are positioned. Fixed tread plates 20 are formed at the outer ends of the radial webs and arranged in circumferential relation to each other. These plates are so positioned as to cause a space to occur between them of sufficient circumferential length for the reception of the adjustable tread members.

Reference being had to Fig. 3 of the drawings, it will be seen that tread members 19 are formed with arcuate tread plates 21 which are of a length adapted to permit them to fit between the adjacent ends of the fixed tread plates 20 and to pivotally swing outwardly from circumferential alinement therewith upon pivot pins 22 which extend through flanges 23 and 24 of the tread members and also pass through the side plates 11 and 12 of the wheel. A boss 25 is formed beneath the tread plate 21 and is adapted to register with the openings in the side flanges 23 and 24 in a manner to secure the tread member against lateral movement. Formed integral with each of the tread plates 21 and extending inwardly therefrom is a flight plate 26. This plate is arcuate and is formed concentric with the pin 22. In order to reinforce this plate it is tied to the side flanges 23 and 24 by webs 26' which pass along clearance slots 28 formed in the outer periphery of the side plates 11 and 12. It will thus be seen that as the members 19 are swung outwardly the arcuate flight plates 26 will fill the opening between the fixed tread plates 20 in a manner to close the opening. The spaces which would normally be opened in the side of these plates are closed by the side flanges 23 and 24 which are of a width sufficient for this purpose.

As a means for adjustably maintaining the faces of the movable tread plates in a given angular relation to the periphery of the wheel and to vary the increased tractive efforts produced by this angular relation, a series of parallel grooves are formed in the face of the flight and are adapted to receive square locking pins 27 which extend the length of the flight face and pass through the side plates 11 and 12 of the wheel. In this manner the movable treads may be positively secured in any desired position and adapted for use in soil of various hardness. Due to the arrangement of the tread plates they will have the effect of a wedge and as the wheel rotates will act to raise the vehicle from the ground. This effort, added to the normal action of the wheel, will cause it to more positively bear and engage the road-way and will therefore increase the tractive efforts of the wheel and consequently decrease its slippage.

It will thus be seen that the wheel here provided possesses few movable parts, all of which are strongly designed and which may be easily adjusted to meet various highway requirements.

While I have shown the preferred construction of my tractor wheel as now known to me, it is evident that various changes in the combination, construction and arrangement of parts may be made by those skilled in the art without departing from the spirit of my invention.

I claim:

1. A vehicle wheel comprising a hub, a pair of circular disks secured thereto and in parallel relation to each other, a series of arcuate tread plates pivotally mounted at corresponding ends and disposed around the periphery of said disks, and means whereby the free ends of said plates may be adjustably secured in various projecting relations to the circumference of the disks.

2. A wheel comprising a hub, a pair of circular disks of equal size secured to said hub and extending parallel to each other, a series of fixed tread plates disposed at intervals around the periphery of said disks, a series of movable tread plates disposed between said fixed plates and pivotally held at corresponding ends, an arcuate flight plate secured at the free end of each of said movable tread plates, and extending inwardly therefrom, and means whereby said tread plates may be adjusted to expose various lengths of the flight plates.

3. A wheel comprising a hub, a pair of circular disks of equal size secured to said hub and extending parallel to each other, a series of fixed tread plates disposed at intervals around the periphery of said disks, a series of movable tread plates disposed between said fixed plates and pivotally held at corresponding ends, an arcuate flight plate secured at the free end of each of said movable tread plates and extending inwardly therefrom, means whereby said tread plates may be adjusted to expose various lengths of the flight plate, and side flanges formed upon opposite sides of said movable tread plates and adapted to overlap the edges of the circular body plates.

In testimony whereof I have signed my name to this specification.

W. E. WILD.

Copies of this patent may be obtained for five cents each, by addressing the "Commissioner of Patents, Washington, D. C."